No. 879,801. PATENTED FEB. 18, 1908.
C. F. SWANSON.
EGG LIFTER.
APPLICATION FILED JULY 16, 1907.
2 SHEETS—SHEET 1.
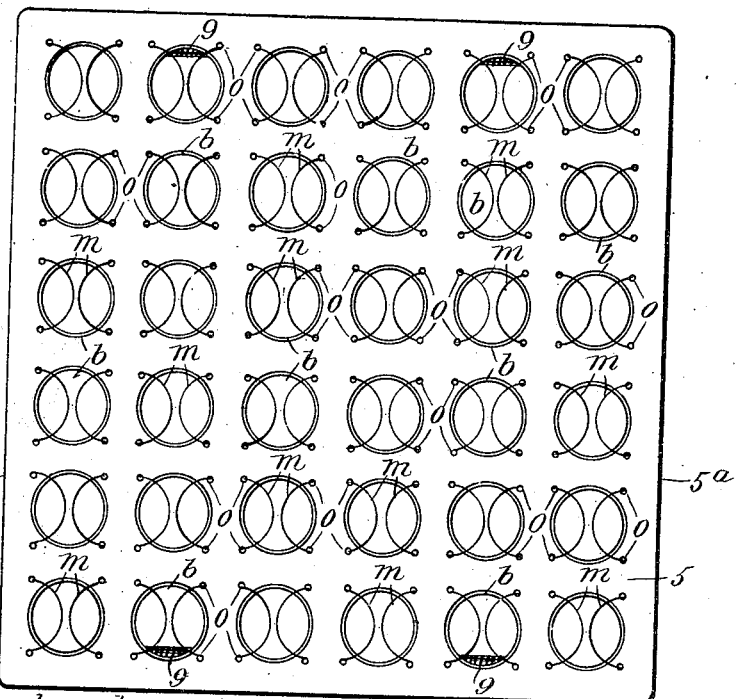
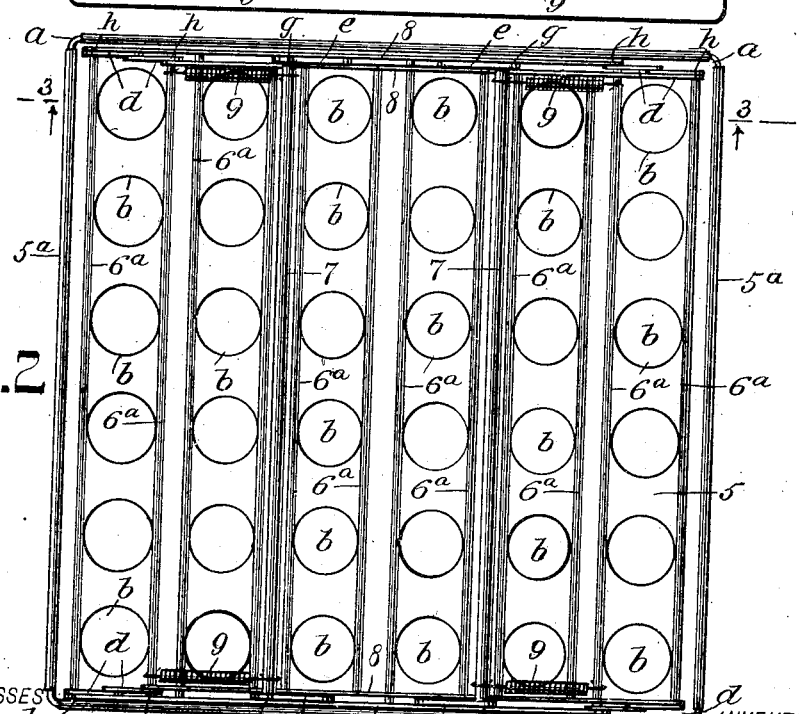
WITNESSES
INVENTOR
Carl F. Swanson
BY
ATTORNEYS
THE NORRIS PETERS CO., WASHINGTON, D. C.

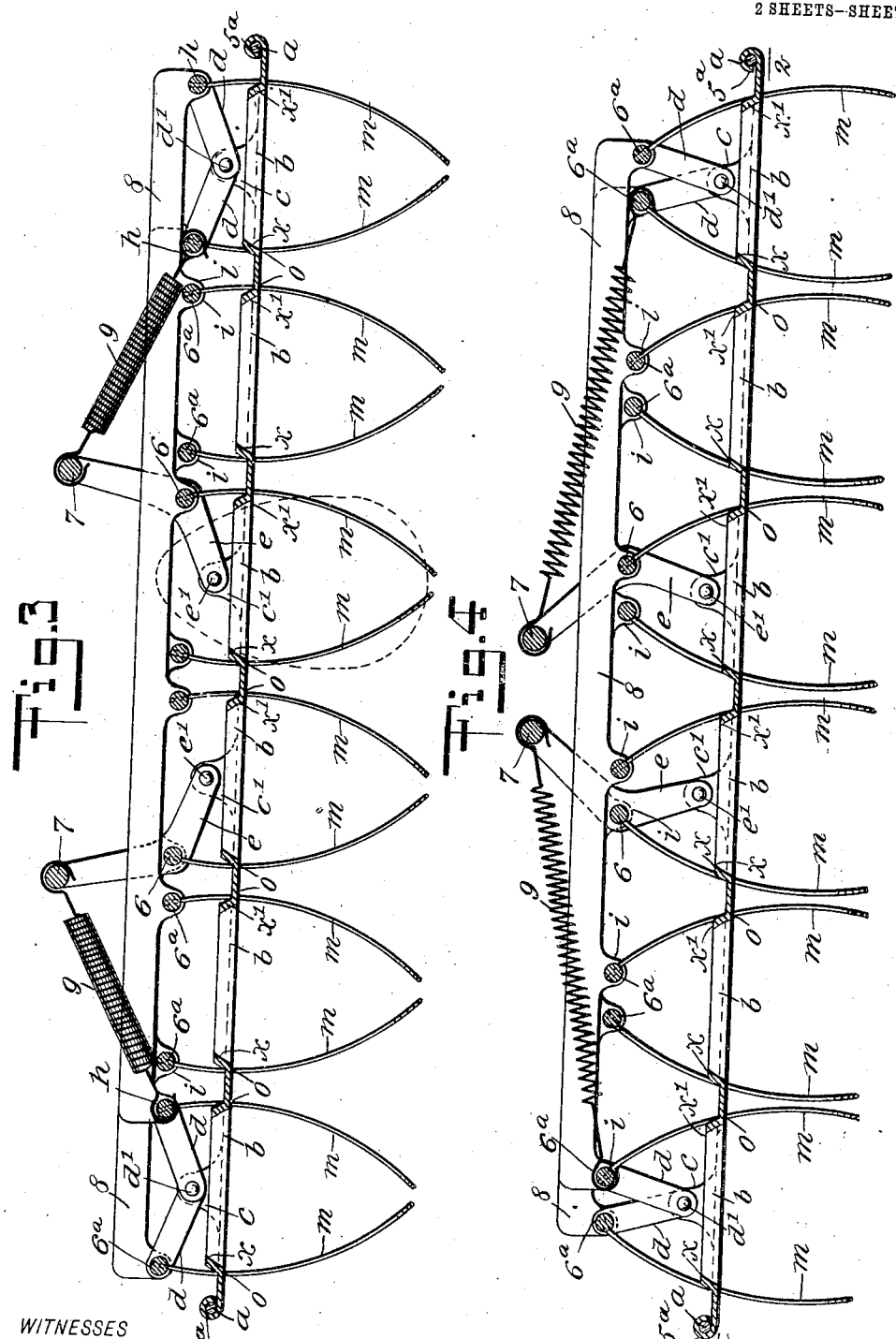

UNITED STATES PATENT OFFICE.

CARL F. SWANSON, OF ST. PAUL, MINNESOTA, ASSIGNOR TO X-RAY EGG TESTER CO., OF ST. PAUL, MINNESOTA.

EGG-LIFTER.

No. 879,801.     Specification of Letters Patent.     Patented Feb. 18, 1908.

Application filed July 16, 1907. Serial No. 384,038.

*To all whom it may concern:*

Be it known that I, CARL F. SWANSON, a citizen of the United States, and a resident of St. Paul, in the county of Ramsey and State of Minnesota, have invented new and useful Improvements in an Egg-Lifter, of which the following is a full, clear, and exact description.

This invention relates to egg lifters employed for lifting eggs in quantity from a crate or the like, disposing the eggs while in the lifter for inspection in a tester device, and after they are tested returning the eggs in proper order within the crate.

The object of my present invention is to simplify and improve the egg lifter device, for which a patent was issued to me April 23, 1907, No. 851,631.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a reversed plan view of the improved egg lifter; Fig. 2 is a plan view of details that appear above the line 2—2 in Fig. 4; Fig. 3 is an enlarged transverse sectional view, substantially on the line 3—3 in Fig. 2, showing working parts of the device in normal adjustment; and Fig. 4 is a transverse sectional view on the same line as Fig. 3 but showing working details adjusted for engaging with eggs that are to be tested.

A base plate 5 having a rectangular marginal form, receives and supports in proper relative positions the operative details of the device. Preferably the base plate 5 is formed of galvanized sheet metal, having a wire ring $a$ secured by a close folded hem $5^a$ around the edge thereof, stiffening the said plate, and keeping it in a level condition. In the base plate 5 a number of rows of spaced circular apertures $b$ are formed, these similar apertures each having a beveled flange formed around its edge, which further stiffens the plate, and also adapts eggs to pass freely into the apertures. At two opposite edges of the base plate 5, a plurality of ears $c, c'$, are formed which project upward. The ears $c$ at each edge are disposed near the corners of the base plate, and the remaining pair $c'$ are equally spaced from the ears $c$. Upon each pair of ears $c$ at a side edge of the base plate 5, a pair of link plates $d$ have corresponding ends thereof lapped upon each other and pivoted upon respective ears as at $d'$. Upon the innermost pair of ears $c'$, at each side edge of the base plate before mentioned the lower end of an angle lever $e$ is lapped and pivoted, as appears at $e'$ in Figs. 3 and 4.

Two spacing rods 6 extend transversely across the upper side of the base plate 5, and at their ends the angle levers $e$ are pivoted between their ends, preferably at their angles, as appears in Figs. 3 and 4. Two handle bars 7 are employed which extend across the upper side of the base plate 5, and are pivoted at their ends upon respective upper ends of the angle levers $e$, as shown at $g$ in Fig. 2.

Two similar carrier bars 8 are provided for each side edge of the base plate having the ears $c, c'$ thereat; and upon the upper ends of the links $d$, corresponding ends of the carrier bars are lapped and pivoted by their loose engagement with the ends $h$, on spacing rod $6^a$, there being one of said rods extended between each opposite pair of said link plates. It will be seen that the pair of carrier bars 8 at each side edge of the base plate 5, are disposed at each side of the angle levers $e$, or in other words, said levers are located between the paired carrier bars, thus permitting a free longitudinal movement of said carrier bars.

Upon the handle bars 7 adjacent to the carrier bars 8, ends of coiled springs 9 are loosely secured, the other ends of said springs being connected to the spacing rods $6^a$ that are nearest to the handle bars. It will be noticed that the outermost end of each carrier bar 8 is pivoted on a spacing rod $6^a$ which is nearest to the transverse edge $5^a$ of the base plate 5, and that the links $d$ which are pivoted at the sides of said ends of the carrier bars, incline outward or toward said transverse edges of the base plate respectively. The length of the coiled springs 9 is so proportioned, that when all of said springs 9 are free to pull the handle bars 7 and spacing rods $6^a$ in pairs toward each other, the link plates $d$, on the ends of said spacing rods will be inclined toward the handle bars. The carrier bars 8 are of such a length that when the springs 9 are fully retracted, the remaining or innermost ends of said carrier bars are disposed opposite respective ends of the spacing rods, which are engaged by ends of the springs 9 and are thereon pivoted.

Upon the lower edges of the two carrier bars 8, which are at the innermost sides of the angle levers $e$, a number of ears $i$ are formed, oppositely in pairs, each pair being connected by a transverse spacing rod $6^a$. Adjacent each ear $i$, a similar ear $i$ is formed on the lower edge of the corresponding outermost carrier bar 8, these ears $i$ on the outer carrier bars being also connected in pairs that are opposite each other, by transverse spacing rods $6^a$. It will be noted that the spacing rods 6, $6^a$, are arranged parallel with each other, and that the rods which at their ends are connected with the outermost carrier bars 8, are arranged above and near corresponding points $x$ on the flanged apertures $b$. It will also be seen that the spacing rods which are secured at their ends on the innermost carrier bars 8, are respectively positioned above and at points $x'$ on the flanged peripheries of the apertures $b$ that are diametrically opposite from the points $x$.

The base plate 5 is perforated in rows at intervals, each row of small perforations $o$ being positioned directly below a respective spacing rod 6, $6^a$, and in pairs, are spaced apart a distance about equal with the diameter of the circular apertures $b$. Upon each spacing rod a series of depending spring wire lifting loops $m$ is secured by the ends of said loops, that are first passed upward through corresponding perforations $o$, thus disposing the bowed portions of the lifting loops an equal distance below the base plate.

It will be understood from the foregoing description that the lifting loops $m$, on one spacing rod are disposed opposite those on a corresponding spacing rod that is on a different pair of carrier bars. As shown in Fig. 3, the lifter loops in pairs are curved towards each other from opposite points $x$, $x'$ on the base plate, which disposes each of said pairs of lifter loops below an aperture $b$, with their looped lower portions curved toward and nearly contacting with each other.

In operation, the handle bars 7 are grasped, and the device manipulated so as to dispose each pair of lifter loops $m$ above an egg in a crate, the clasping pressure drawing the handle bars towards each other, and correspondingly rocking the angle levers $e$. This action will pull upon the carrier bars 8, moving them oppositely and against stress of the springs 9, and spread apart the pairs of lifter loops $m$, so that the latter may be passed down at each side of the egg they are to lift. Pressure on the handle bars 7 is now relaxed sufficiently to permit the springs 9 to contract, and thus cause a reversed sliding movement of the carrier bars 8, which will draw the spacing rods in pairs toward each other, and correspondingly push the lifter loops $m$ down through the perforations in the base plate, thereby disposing the bights of the wire loops, in clasping engagement with a number of eggs equal with the number of apertures $b$ in the base plate.

In pushing the base plate down over a number of eggs, that are held in pockets within a crate as usual, the smaller ends of the eggs will pass upward into respective apertures $b$ and become centered therein, so that the clasping ends of the loops $m$ may properly engage with the eggs, and hold them safely secured between the bowed lifter loops, until released by a reversed manipulation of the working parts as will be understood from the foregoing description.

Having thus described my invention, I claim as new and desire to secure by Letters Patent:

1. An egg lifter, comprising an apertured base-plate, two carrier-bars slidable at each edge of the base-plate, means for simultaneously sliding the carrier-bars, spacing-rods connecting the said bars in pairs, and lifter-loops hung from the spacing-rods and working through perforations in the base-plate.

2. An egg lifter, comprising a base-plate having apertures therein, angular levers pivoted on the base-plate, two slidable carrier-bars at each side edge of the base-plate, and pivoted at the sides of the angle-levers, spacing-rods mounted at their ends on the carrier-bars and connecting the said bars in pairs, and lifter-loops hung from the spacing-rods and working through perforations in the base-plate.

3. An egg lifter, comprising a base-plate having apertures therein, two angular levers pivoted on the base-plate near each edge thereof, handle bars connecting opposite levers, two pairs of oppositely slidable carrier-bars at the sides of the angle-levers and pivoted thereto at their angles, spacing rods mounted at their ends on the carrier bars, and lifter loops hung from the spacing rods and working through perforations in the base plate.

4. An egg lifter, comprising a base plate having apertures therein, angular levers pivoted on the base plate at their lower end and near opposite edges of the base plate, two pairs of oppositely slidable carrier bars, pivoted on the levers at their angles, spring actuated handle bars connecting opposite pairs of the angle levers, spacing rods mounted at their ends on the carrier bars, and lifter loops hung from the spacing rods and working through perforations in the base plate.

5. An egg lifter, comprising a base plate having apertures therein, a pair of spaced angular levers pivoted by their lower ends on ears formed on each of two opposite edges of the base plate, two pairs of oppositely slidable carrier bars pivoted upon the levers at their angles, handle bars connecting opposite pairs of the angle levers at their upper ends, spacing rods mounted at their ends upon the carrier bars, springs connecting the handle bars with certain of the spacing rods, and lifter loops hung from the spacing rods and working through perforations in the base plate.

6. An egg lifter, comprising a base plate having spaced rows of apertures therein, four angle levers pivoted at their lower ends on ears formed on the side edges of the base plate, carrier bars pivoted at their ends on the lapped ends of link plates, that diverge at their remaining ends which are pivoted upon ears on the base plate, said carrier bars being pivoted on the angle levers at angles of the latter, spring drawn handle bars mounted at their ends on opposite pairs of the angle levers, spacing rods mounted at their ends upon ears formed on the carrier bars, and spring wire lifter loops that pass loosely through perforations in the base plate and are secured at their spaced ends upon the spacing rods.

7. An egg lifter, comprising an apertured base plate, stiffened with a border ring secured on its edge, depending ears on opposite edges of the base plate, angle levers pivoted at their lower ends upon certain of these ears, links lapped at one end of each and pivoted thereat upon others of said ears, carrier bars pivoted at their ends on the diverged ends of said link plates, handle bars connecting opposite upper ends of the angle levers, spacing rods mounted at their ends on opposite carrier bars, contractile springs mounted at their ends respectively upon the handle bars and adjacent spacing rods, and spring wire loops that pass loosely through perforations in the base plate and are secured at their spaced ends upon the spacing rods.

In testimony whereof I have signed my name to this specification in the presence of two subscribing witnesses.

CARL F. SWANSON.

Witnesses:
J. M. ANDERSON,
FRED E. MABLER.